United States Patent [19]
Milenkovic

[11] 3,994,187
[45] Nov. 30, 1976

[54] EPICYCLIC TRANSMISSION

[75] Inventor: Veljko Milenkovic, Glencoe, Ill.

[73] Assignee: The United States of America as represented by the Secretary of the Navy, Washington, D.C.

[22] Filed: Feb. 14, 1975

[21] Appl. No.: 550,239

[52] U.S. Cl. .................................................. 74/804
[51] Int. Cl.² .......................................... F16H 1/28
[58] Field of Search ............................... 74/804, 805

[56] References Cited
UNITED STATES PATENTS

| | | | |
|---|---|---|---|
| 1,641,766 | 9/1927 | Laukhuff | 74/804 |
| 3,073,184 | 1/1963 | Braren | 74/804 |
| 3,129,611 | 4/1964 | Lee | 74/804 |
| 3,448,638 | 6/1969 | Zahlaus | 74/804 |

*Primary Examiner*—Benjamin W. Wyche
*Assistant Examiner*—Lance W. Chandler
*Attorney, Agent, or Firm*—R. Sciascia; R. Beers; S. Sheinbein

[57] ABSTRACT

An epicyclic transmission of the class wherein rotation of a crankshaft is transferred to an output shaft by means of discs mounted eccentrically on the crankshaft, operating stably over a wide range of operation. All of the centrifugal forces developed in the various rotating members are compensated to improve stability. One embodiment includes shoulders integral with the discs abuttingly engaging guidetracks integral with the transmission housing for transmitting centrifugal forces to the housing. Another embodiment includes pin support means for counterbalancing skewing forces which result from unsynchronized disc rotation. A third embodiment utilizes a cage comprising supportings and bars for transmitting torque to the output shaft. A fourth embodiment utilizes a planetary gearing arrangement for transferring input rotation to a plurality of driver shafts. The rotation of the driver shafts is transferred to the output shaft by a plurality of seating rings.

6 Claims, 12 Drawing Figures

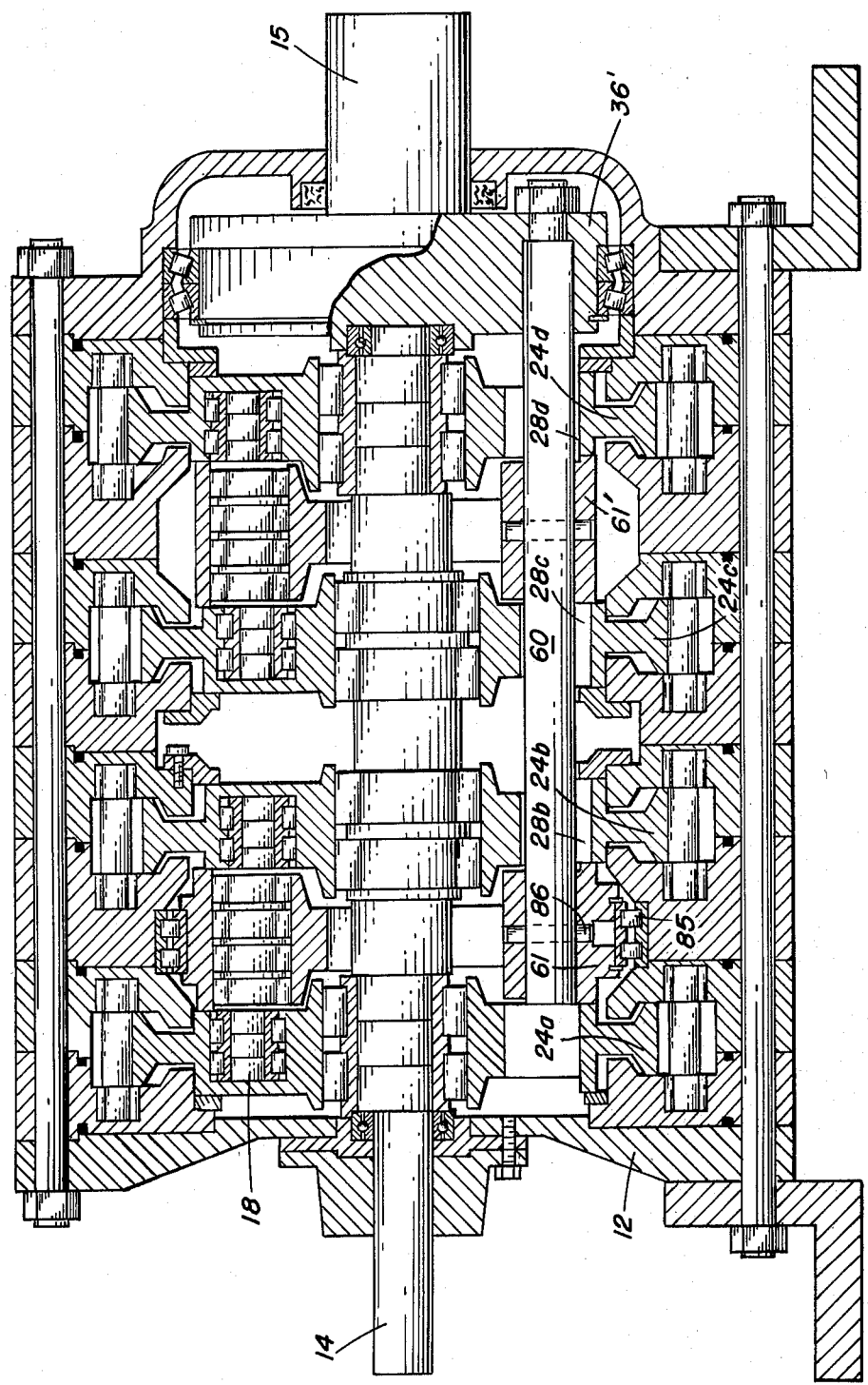

EPICYCLIC TRANSMISSION

BACKGROUND OF THE INVENTION

The present invention relates in general to improvements in epicyclic transmissions and more particularly to improvements for providing stable transmission operation over a wide operating range.

Modern rotating machinery is required to operate at high speeds. The definition of high speed operation is, of course, related to the size of the machinery; however gas turbine speeds over 50,000 rpm are not uncommon. Therefore, devices transferring power from such high speed machinery must themselves be capable of high-speed operation. Such devices are frequently called upon to perform a concomitant function of reducing a high-speed input to a low-speed output. It is desirable that this speed reduction be accomplished in as few steps as possible since the amount of equipment required to accomplish the total speed reduction depends upon the number of steps required. Therefore, it is advantageous for a power transmission device to be capable of providing both stable high-speed operation and large speed reduction ratios.

As in any rotating machinery, problems accompanying unreacted (uncompensated) centrifugal forces, unsynchronized operation or inefficient operation are inherent in power transmissions. These problems are obviously intensified when such devices are operated at high-speeds. The undesirable effects of these problems are legion: vibration; noise; and unreliability being but a few. Furthermore, at high speeds any instability in operation is at best inefficient, and at worst disastrous.

Large speed reduction requirements tend to worsen the above-described problems. Speed reduction ratios in the order of 100 to 1 are desirable. In addition to reducing the amount of necessary equipment, large speed reduction ratios provide versatility to a transmission. By having a large speed-reduction ratio, the transmission can be applied to a wide variety of machinery and speeds of operation. The resulting cost savings are obvious.

One form of power transmitting device often used in high-speed applications is an epicyclic transmission. Epicyclic transmissions are susceptible to problems similar to those inherent in the above discussed power transmitting devices. Examples of attempts to improve the performance of epicyclic transmissions are Braren, U.S. Pat. No. 1,867,492 and Gorfin, U.S. Pat. No. 3,258,994. The devices discussed in these patents purport to improve transmission performance by providing various configurations for the transmission gearing. However, these devices are not addressed to problems associated with unreacted centrifugal forces arising in the transmission rotating members. Therefore these devices are susceptable to unstable operation at high speeds.

Kari, U.S. Pat. No. 3,324,746 is an example of an epicyclic transmission having means for counterbalancing only some of the centrifugal forces developed therein. The Kari device has an eccentric ring or a balanced wheel to counter centrifugal forces developed in the driving shaft. The centrifugal forces result from eccentric segments positioned on the driver shaft. The ring or wheel is mounted on the driver shaft, but at a position diametrically opposed (180°) to the eccentric segments also positioned on the shaft. The Kari device therefore serves only to counterbalance centrigual force developed in the driver shaft. During high-speed operation, if is desirable to counter all centrifugal forces which are developed in any of the rotating members. Any unbalanced forces, as above-discussed, can become dangerous.

The present invention overcomes the above-discussed problems by counteracting and reducing essentially all centrifugal forces developed in an epicyclic transmission.

In the preferred transmission embodiments of the invention, transfer of torque to the output shaft is accomplished without the use of gears. By eliminating gears, problems attendant therewith are also eliminated. Such problems may include those resulting from vibration and noise. In high torque applications, gear failure is a very real problem. Therefore, transmission reliability is also improved by eliminating gears.

BRIEF SUMMARY

Briefly, the device of the present invention is a means for improving the stability of epicyclic transmissions. In epicyclic transmissions, rotation of a crankshaft is transferred by eccentrically mounted discs either to the transmission housing or to reverter pins. Rotation of the housing or reverter pins is transferred to an output shaft. By effectively counterbalancing centrifugal forces developed by the rotating discs, the transmission of the present invention is stable during high speed operation.

In one embodiment of the transmission, centrifugal forces are transferred from the discs to the transmission housing. Shoulders integral with the discs are rollingly contacting guidetracks integral with the housing. Centrifugal force is transferred from he discs to the housing. Rolling contact between a cylinder (the disc shoulders) and the inner surface of a cylindrical passage (the housing guidetracks) allows transfer of large centrifugal forces at low contact stress. Advantage is taken of the rotational forces imparted to the housing by the frictional engagement between the shoulders and the guidetracks. Augmenting the rotational forces thus developed increases the power capability and efficiency of the transmission.

In another embodiment of the epicyclic transmission, stability is increased by mounting the reverter pins as simple beams. Reverter pins attached at one end to a guide plate and at the other end to a spider connected to the output shaft are constrained against skewing forces. Skewing forces are those forces applied to the reverter pins as a result of the unsynchronized rotation of the discs.

A modification of this last transmission embodiment further improves the stability thereof through reduction of reverter pin free span. Free span is the unsupported length of the reverter pins. The centralmost discs are positioned on a common hub about a crankshaft eccentricity and the outermost discs are positioned near the guideplate and spider respectively. This positioning of the discs reduces reverter pin free span. Positioning a plurality of mounting rings along the crankshaft through which the reverter pins pass further reduces the reverter pin free span.

Another embodiment of the epicyclic transmission has a plurality of support rings, at least one of which is fixed to the output shaft. The support rings are connected by bars or struts to form a rigid cage. The bars or struts are spaced in a circle about the transmission crankshaft and are positioned to run parallel therewith.

The transmission reverter pins are connected at each end thereof to the rings. Thus, the force exerted on the reverter pins by the discs is transferred to the output shaft by the cage formed by the bars and the rings. The cage thus increases the stability and efficiency of the transmission.

An alternative embodiment of the epicyclic transmission exhibits stable operation with low centrifugal forces during high-power applications. Power and rotation of an input shaft is transmitted by a planetary gearing arrangement comprising a sun gear attached to the input shaft and planetary gears attached to a plurality of parallel driver shafts. The driver shafts are combination crankshaft-reverter pins and are used to transmit rotation from the planet gears to the discs. By transmitting power over a plurality of paths, the stresses placed on each shaft are reduced thus resulting in increased reliability and operating range. The gearing relationship between the sun gear and the planet gears determines the speed of rotation of the discs and hence the centrifugal forces developed therein.

OBJECTIVES

A broad objective of the present invention is to improve the stability of epicyclic transmission.

Another objective is to counterbalance essentially all centrifugal forces developed in epicyclic transmissions.

Another objective is to increase the operating range of epicyclic transmissions.

Another objective is to improve the reliability and efficiency of epicyclic transmissions.

Other objects, features and advantages as well as a fuller understanding of the invention may be had by referring to the following description, taken in conjunction with the accompanying drawings in which:

FIGS. 5a, 5b and 5c show still another embodiment of the invention of an epicyclic transmission having bars or struts to improve transmission stability.

Throughout the Figures of the drawings, the same parts are represented by the same reference numerals while equivalent parts are given prime designations.

GENERAL DESCRIPTION

Figure 1A:
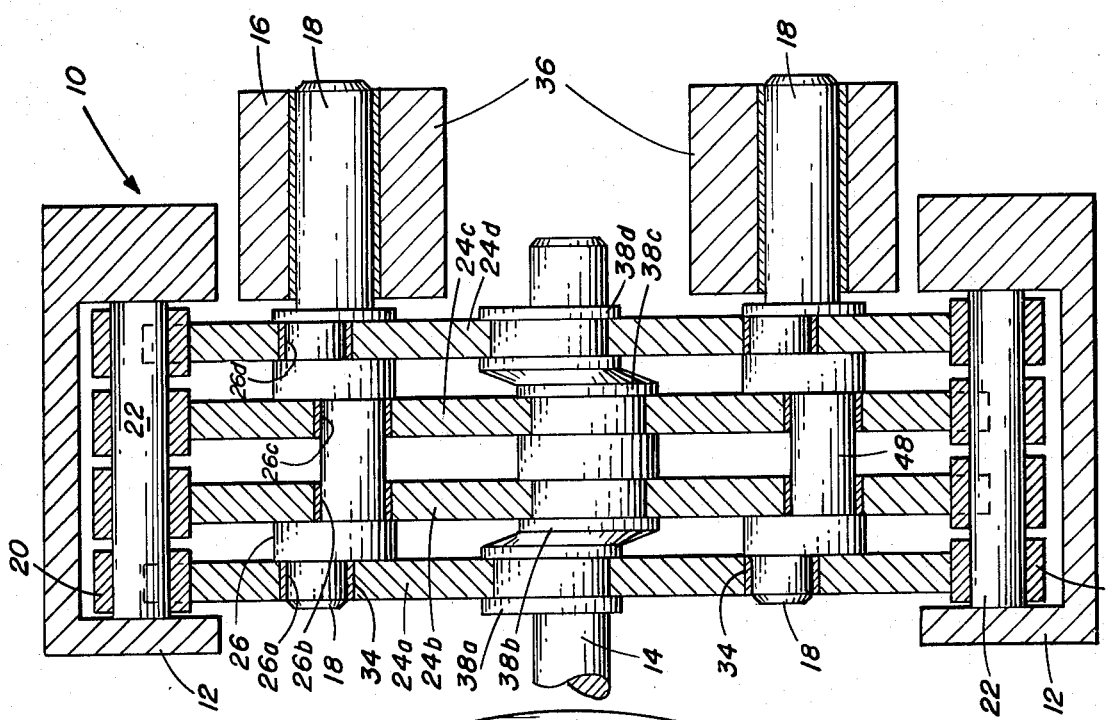
FIGS. 1a and 1b show an epicyclic transmission used in the prior art.
Figure 1B:
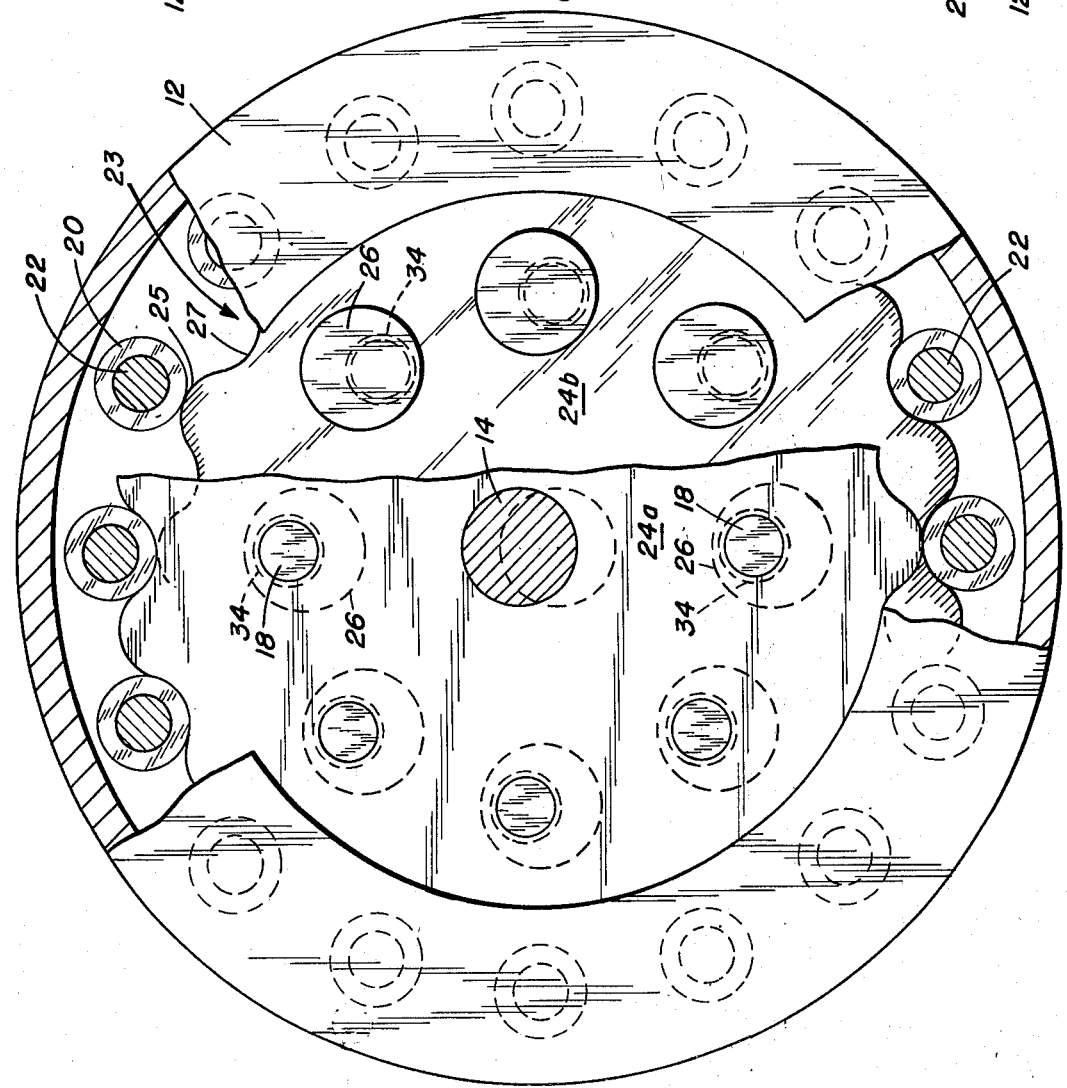

With reference to the drawings, FIG. 1 shows an epicyclic transmission illustrative of those used in the prior art. Transmission 10 establishes communication between a driver element such as crankshaft 14, and a driven element (not shown). The crankshaft 14 is provided with a plurality of eccentricities 38, denoted as 38a, 38b, 38c and 38d and is suitably journaled within transmission housing 12. Rotationally connected to the eccentricities 38 are rotatable elements or discs 24, denoted by 24a, 24b, 24c and 24d. The epicyclic motion is that motion established by the discs 24. The discs 24 have a plurality of circumferentially arranged apertures 26 (denoted 26a, 26b, 26c and 26d) through which pass reverter pins 18. The pins 18 pass through all of the discs 24 and as shown in FIG. 1b, apertures 26 have an inner diameter which is larger than the outer diameter of the pins 18. Bushings 34 surround pins 18 and contact apertures 26.

As shown, the apertures 26 in each disc are offset from the apertures in adjacent discs to the same extent. For example, the distance of apertures 26a on the disc 24a from the center of disc 24a is identical to the distance of apertures 26b from the center of disc 24b, and so forth. Thus, when discs 24 are positioned on eccentricities 38, the apertures 26 are offset from corresponding apertures in adjacent discs by an amount equal to the offset between adjacent eccentricities. Spider 36 maintains reverter pins 18 in proper alignment.

The axis of eccentricity of the outer discs 24a and 24d are identically oriented as are the axis of eccentricity of the inner discs 24b and 24c. The axis of eccentricity of the discs 24a and 24d is disposed 180° to the axis of eccentricity of the discs 24b and 24c. Thus, centrifugal forces developed as a result of the rotation of crankshaft 14 are equilibrated (counterbalanced).

The outer periphery 23 of cam discs 24 is of a sinuous, uniformly undulating configuration comprising a plurality of concaved equal depressions or recesses 27 and a plurality of convex, equal size projecting lobes 25. Rollingly contacting the undulating periphery of cams 24 are a plurality of rollers 20 interconnected by pins 22. The pins 22 are parallel to the central axis of crankshaft 14.

The number and size of rollers 20 are factors used to determine the number and geometric configuration of the recess-lobe pairs wherein each pair comprises a lobe and an adjacent depression. As known in the art, to cause rotation, the number of rollers 20 will be generally one less than the number of lobe-recess pairs. The rollers 20 are positioned between the outer periphery of cam discs 24 and the housing 12.

Output torque can be transferred from crankshaft 14 by transmission 10 in several ways known in the art. For example, with reverter pins 18 fixed to housing 12, (not shown) an output shaft (not shown) secured to roller-pin 22 will rotate in the same direction as does crankshaft 14. For each complete rotation of crankshaft 14, undulating surface of periphery 23 advances one position with respect to each roller 20.

As an alternative example, with roller-pin 22 fixed to housing 12, an output shaft secured to reverter pins 18 will rotate in a direction opposite to the direction of rotation of crankshaft 14. As crankshaft 14 rotates, the inner periphery of apertures 26 contacts reverter pins 18 to drive the pins accordingly.

Shown in FIGS. 2 and 5 are different embodiments of transmission 10 in which centrifugal forces developed by discs 24 during high-speed operation are efficiently balanced by means of an abutting relationship between discs 24 and housing 12. In this embodiment, torque from crankshaft 14 is transmitted from discs 24 to output shaft 15 by reverter pins 18 attached by spider 36 of output shaft 15.

Integral with housing 12 is a guidetrack 40 comprising grooves 46 positioned between sidewalls 31 formed by inward extensions of housing 12. Rollers 20 are positioned within grooves 46 and contact undulating surfaces 23 as above-described. When the output shaft 15 is connected to the reverter pins, the rollers 20 may be omitted from these embodiments of FIGS. 2 and 5. Abutting relationship between discs 24 and housing 12 occurs between curved surfaces 43 of disc shoulders 42 and correspondingly curved surfaces 33 of guidetracks 40.

Figure 2A:
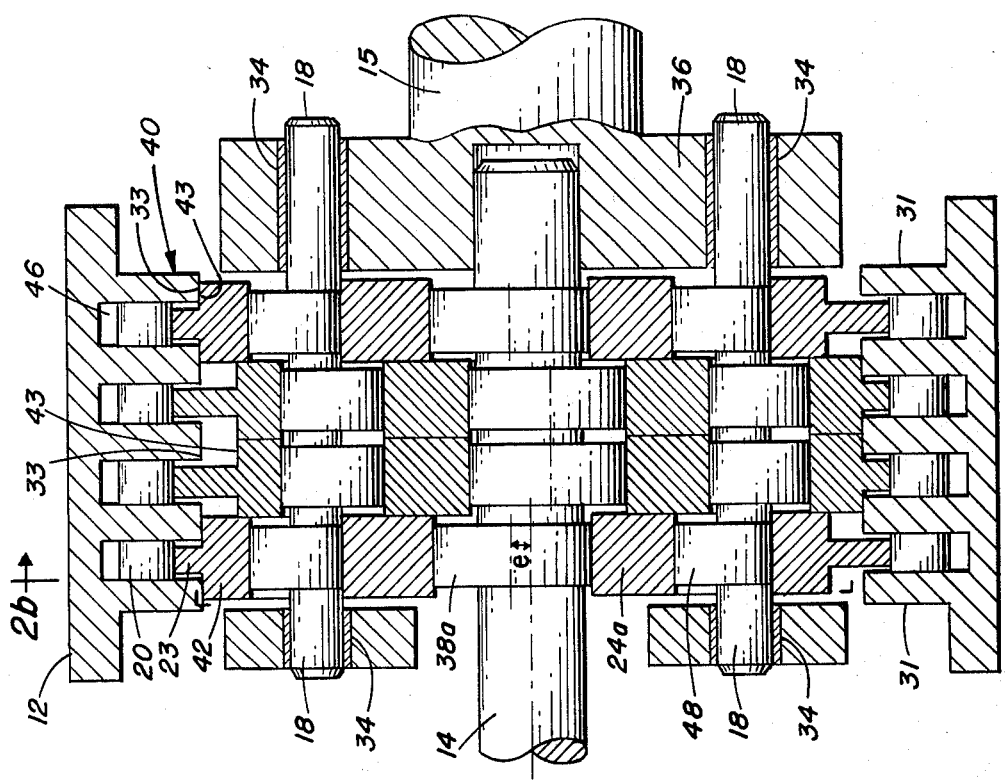
FIGS. 2a and 2b show an embodiment of an epicyclic transmission having guidetracks for counterbalancing centrifugal forces according to the present invention.
Figure 2B:
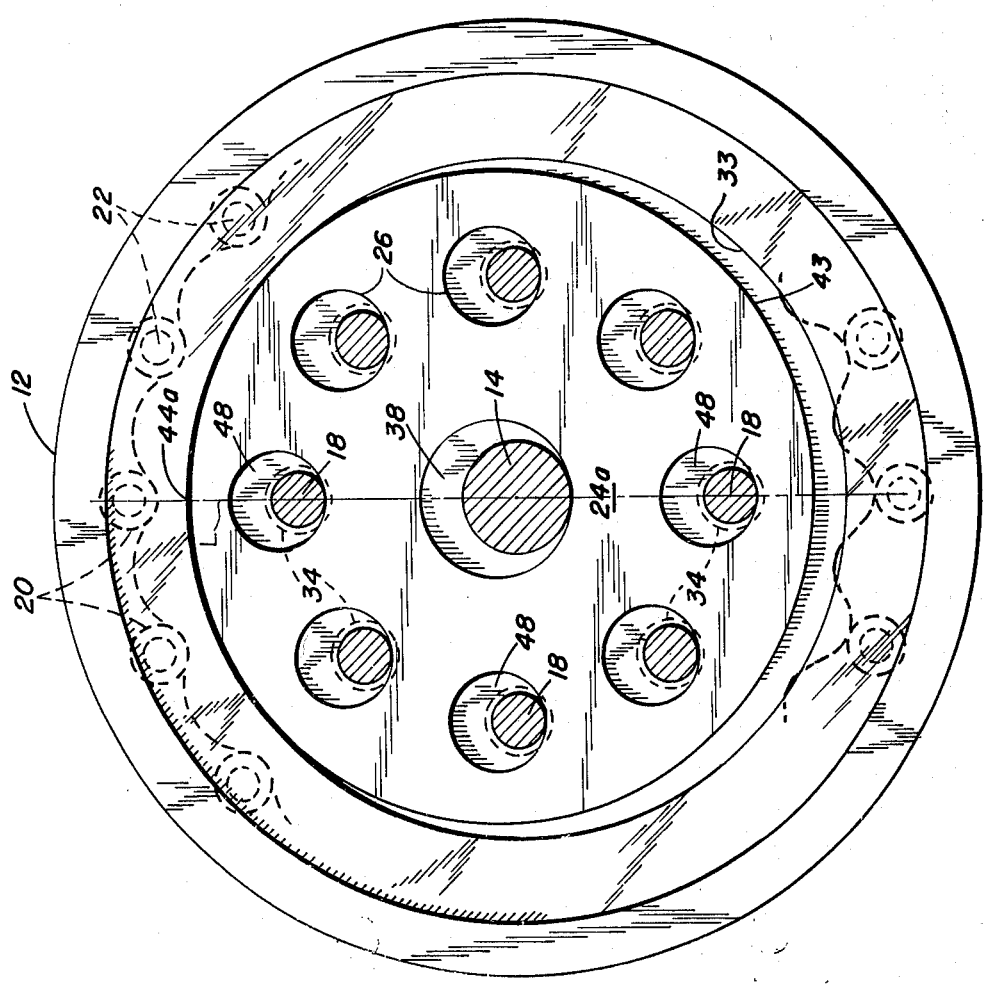

As shown in FIG. 2b, the circular cross-sections of surfaces 43 and 33 have radii which depend upon the number of rollers and the dimension e, the amount of offset between the centerlines of crankshaft 14 (the center of rotation) and eccentricity 38a. In order to insure rolling contact at point 44, the radii of the surfaces 33 and 43 should differ by the dimension e. Furthermore, the radius of surface 43 should be equal to Ne, where N denotes the number of roller pins 22, so that the radius of surface 33 is equal to (N+1)e. The disc 24a contacts the housing at point 44a which rotates as the crankshaft rotates. This rolling contact between surfaces 43 and 33 allows transmission of large forces (normal to the contact point) at low contact stress.

Within apertures 26, eccentric segments 48 connect reverter pins 18 to discs 24. Segments 48 are positioned on pins 18 to correspond to eccentricities 38 so that as crankshaft 14 rotates, segments 48 and eccentricities 38 rotate in unison. This uniform rotation results in a solid path between crankshaft 14 and the housing along a path indicated by line L. Any centrifugal forces developed during roation of disc 24a are therefore transmitted to the housing.

It is known that a transmission device which reduces a high speed input to a low-speed output also increases the torque from a low input torque to a high output torque. In order for the higher output torque to be developed, a reaction torque equal to the difference between the output torque and the input torque must be transmitted to the housing. The frictional engagement at point 44a of surfaces 33 and 43 may contribute to the generation of a larger reaction torque to be transmitted to the housing 12, and thereby permit the transmittal of a larger output torque to the shaft 15. This larger torque transmission capability, depending on frictional engagement at point 44a, becomes effective when cranksahft 14 is operating at high speeds, because the force normal to point 44a (hence the frictional force) is related to the centrifugal forces developed in disc 24.

Counteracting centrifugal forces developed in disc 24 through the transmission housing alleviates problems such as transmission bearing failure and inefficiency due to power losses. During high speed operation, centrifugal forces developed in disc 24 may be many times larger than the forces needed to transmit power from the input shaft to the output shaft. By counterbalancing these forces through the transmission housing instead of through the transmission bearings, pins or other transmission members, considerable improvement in transmission stability and reliability results.

Figure 3B:
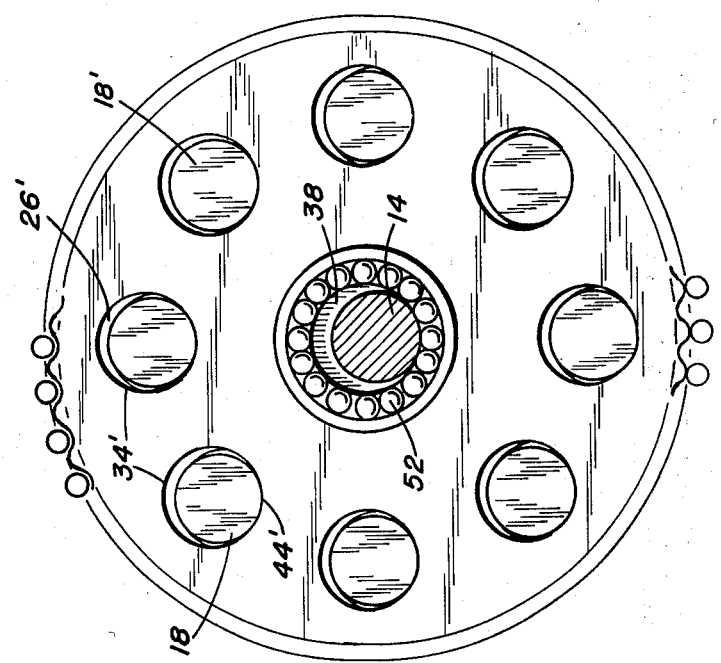
FIGS. 3a and 3b show another embodiment of an epicyclic transmission according to the present invention having concentric reverter pins for counterbalancing centrifugal forces.
Figure 3A:
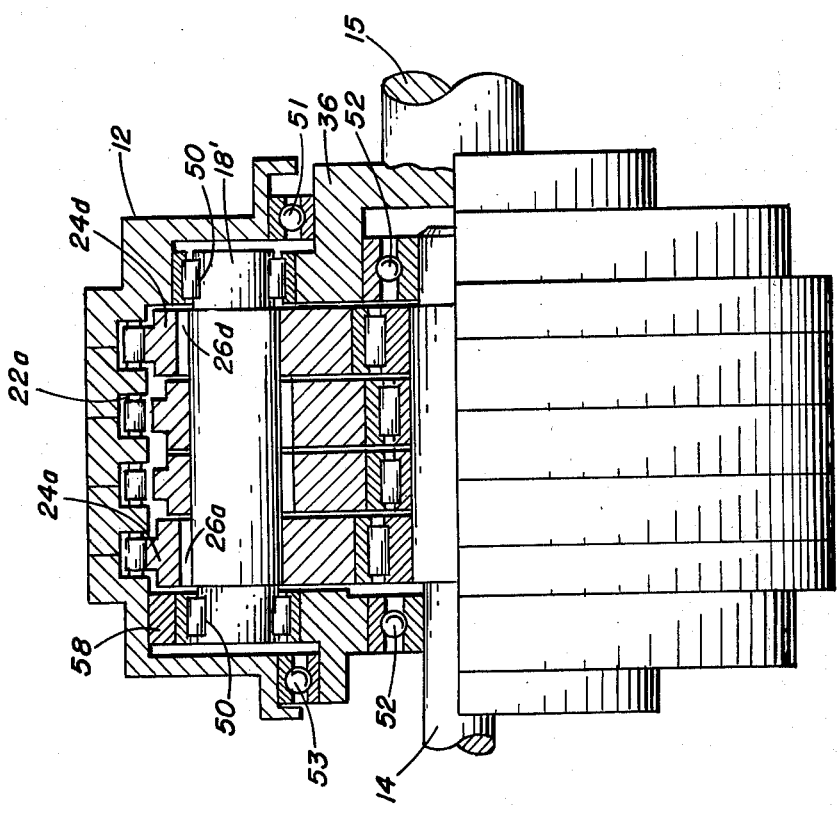

Shown in FIG. 3 is an embodiment of transmission 10 in which centrifugal forces developed by discs 24 during high speed operation are counterbalanced by concentric reverter pins 18'.

As shown in FIG. 3, the shafts 14 and 15 are suitably journaled in housing 12 by bearings 51 and 53. Concentric reverter pins 18' pass through eccentrically disposed apertures 26' of discs 24 and are journaled on one end to a guideplate 58 and on the other end to spider 36 of the shaft 15 by journal bearings 50 and rollingly contact apertures 26' at a point 44'. The guideplate 58 and spider 36 are journaled to crankshaft 14 by bearings 52.

Reverter pins 18' are maintained in parallel alignment with the crankshaft by guideplate 58. The guideplate has apertures positioned to correspond to apertures in spider 36. The guideplate 58 also serves to maintain a constant spacing between pins 18'.

As shown in FIG. 3, reverter pins 18' have no eccentric segments, have a concentric cylindrical body and thus are of circular cross-section. The radius of apertures 26' exceed the radius of the pins by an amount e, the amount of offset between the centerlines of crankshaft (the center of rotation) and eccentricities 38.

Rotation of discs 24 caused by rotation of shaft 14 is transmitted to spider 36 and to output shaft 15 by reverter pins 18' which rotate at a lower rate than shaft 14. Centrifugal forces developed by high speed rotation of discs 24 are transmitted to the reverter pins 18'. The pins may be of enlarged cross-sectional area to withstand the centrifugal forces thus developed.

As shown, rolling contact points 44' traverse the inner periphery of apertures 26' and thus the total area of contact between pins 18' and apertures 26' depends upon the internal peripheral area of apertures 26'. Centrifugal force is countered over the total contact area. The larger the total contact area between force bearing members, the lower the stress exerted on each member. Thus, large centrifugal forces can be countered using a plurality of small reverter pins. However, because eccentric segments 48 of FIG. 2a are omitted from this embodiment of FIG. 3, the diameter of pins 18' may exceed that of pins 18 (FIGS. 1 and 2). Thus, the overall strength of pins 18' exceeds that of pins 18 and the total amount of metal required for pins 18' is less than that required for pin 18. Because of the efficient transfer of centrifugal forces to pins 18', smaller members may be used. Thus, for a given power transfer, the total weight of the transmission shown in FIG. 3, and in particular the weight of discs 24, is held to a low value where compared to transmissions not employing such centrifugal force transfer. The transmission shown in FIG. 3 is a high-speed transmission and is most effective when full-rated torque is not applied unttil operating speed is reached.

As perfectly uniform rotation of discs 24 rarely occurs, pins 18' will be subjected to forces tending to skew the orientation of the pins. Guideplate 58 serves to counter some of this skewing force.

Figure 4:
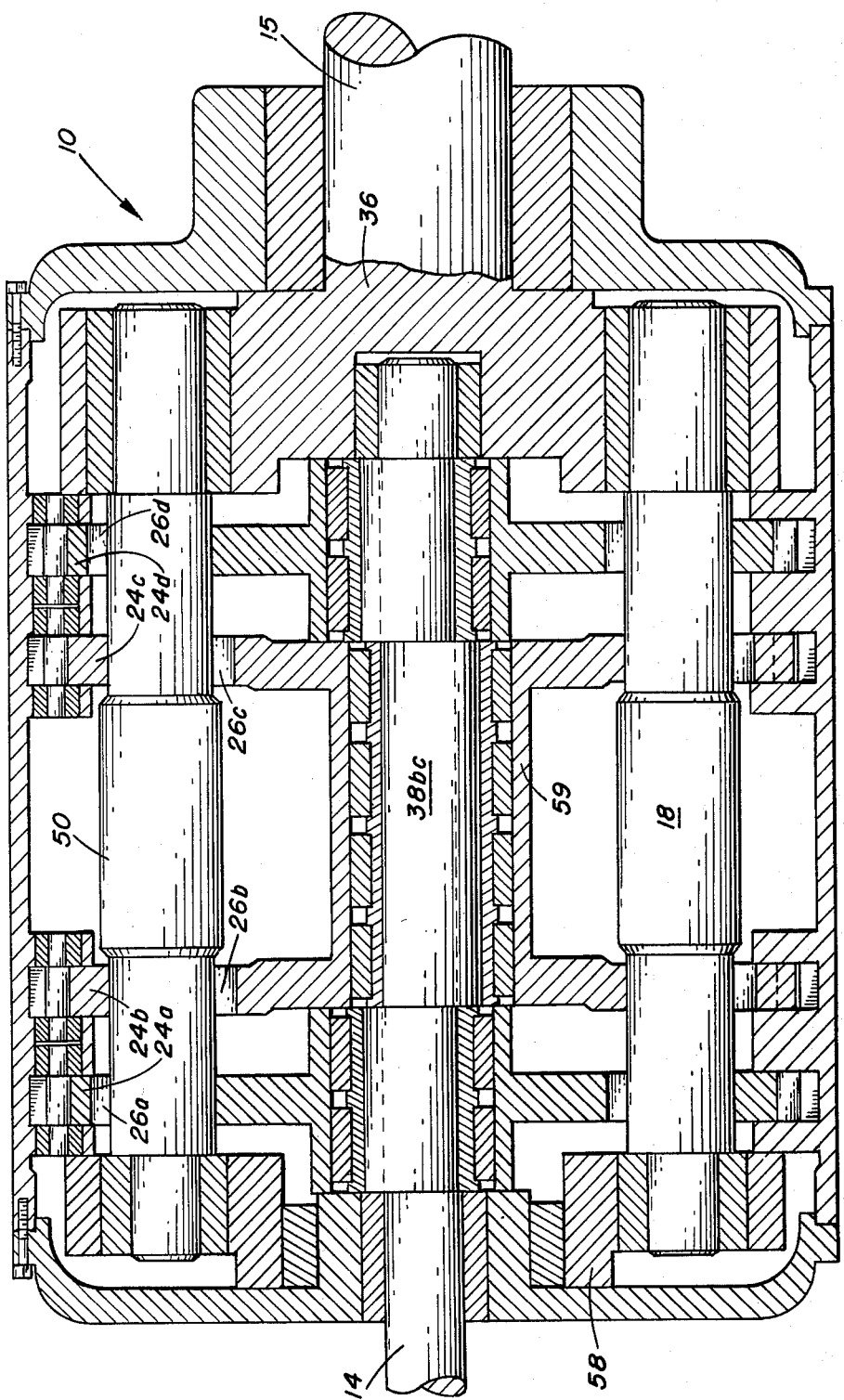
FIG. 4 shows still another embodiment according to the present invention of an epicyclic transmission wherein reverter pin free span is reduced.

FIG. 4 shows an embodiment of transmission 10 which further counters skewing forces resulting from operation of transmission 10. Adjacent inner discs 24b and 24c are positioned on a common hub 59 attached to a single eccentricity 38bc of crankshaft 14. By comparing FIGS. 3 and 4, it is seen that outer discs 24a and 24d are further apart in the FIG. 4 embodiment than discs 24a and 24d in the FIG. 3 embodiment. Reverter pins 18 may have enlarged sections such as section 50, to further improve strength and stability of the pin.

Mounting discs 24b and 24c on a common hub 59 results in maintaining apertures 26b in alignment with apertures 26c. Further improvement in stable operation of the transmission results if the spacing between disc 24b and guideplate 48 as well as between disc 24c and spider 36 are reduced from those spacings shown in FIG. 3. Such positioning, reduces the distance between outer discs 24a and 24d and adjacent members. Thus, any skewing force resulting from misalignment of apertures 26 caused by unsynchronized rotation of discs 24a and 24d is not magnified by long moment arms. Thus, the transmission shown in FIG. 3 is further stabilized and bending forces exerted on pins 18 are further minimized by the placement of discs 24 of the transmission as shown in FIG. 4.

The transmission shown in FIGS. 3 and 4 is best suited for applications which do not require a high starting torque. Such applications are found in fans or propellers. Application for the transmission shown in FIGS. 3 and 4 is also found in systems having a clutch or fluid coupling positioned in series with the transmission.

Figure 5B:
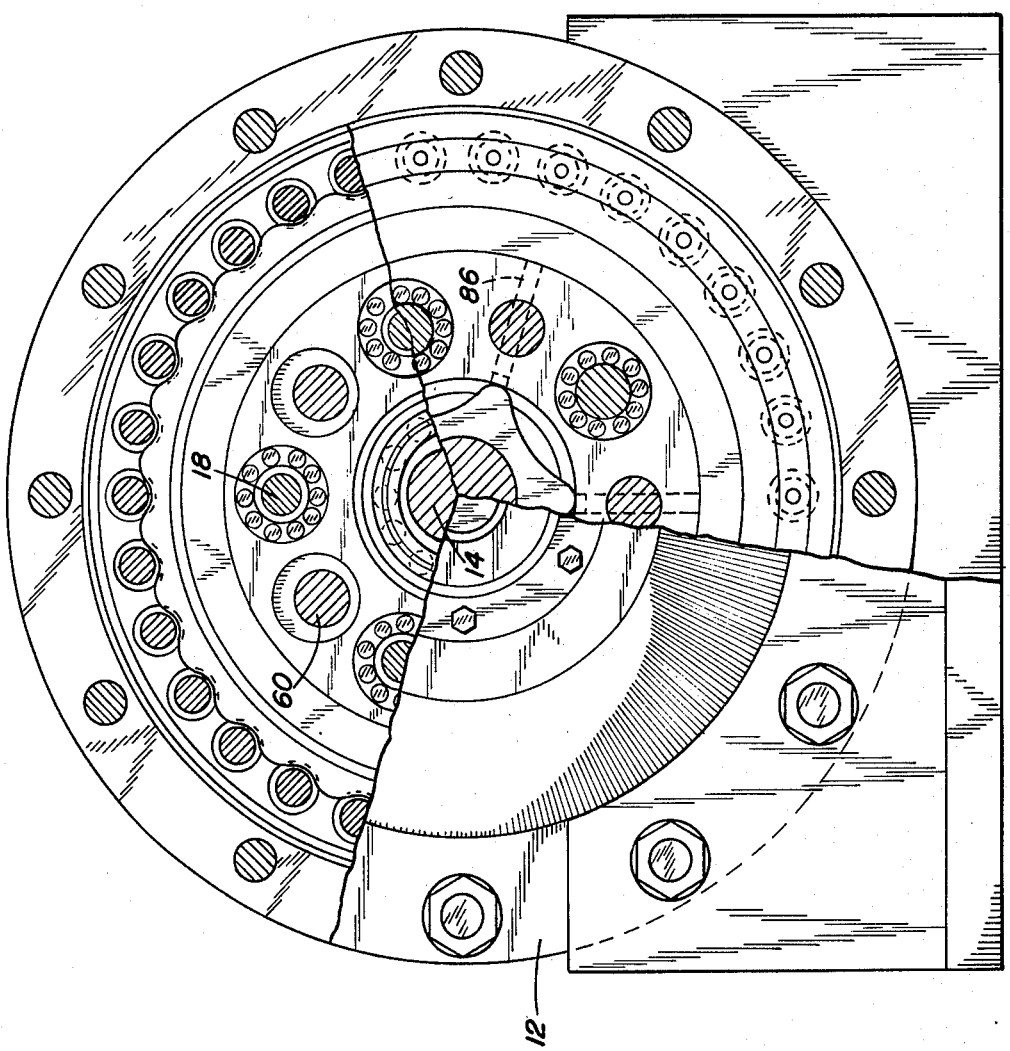
Figure 5C:
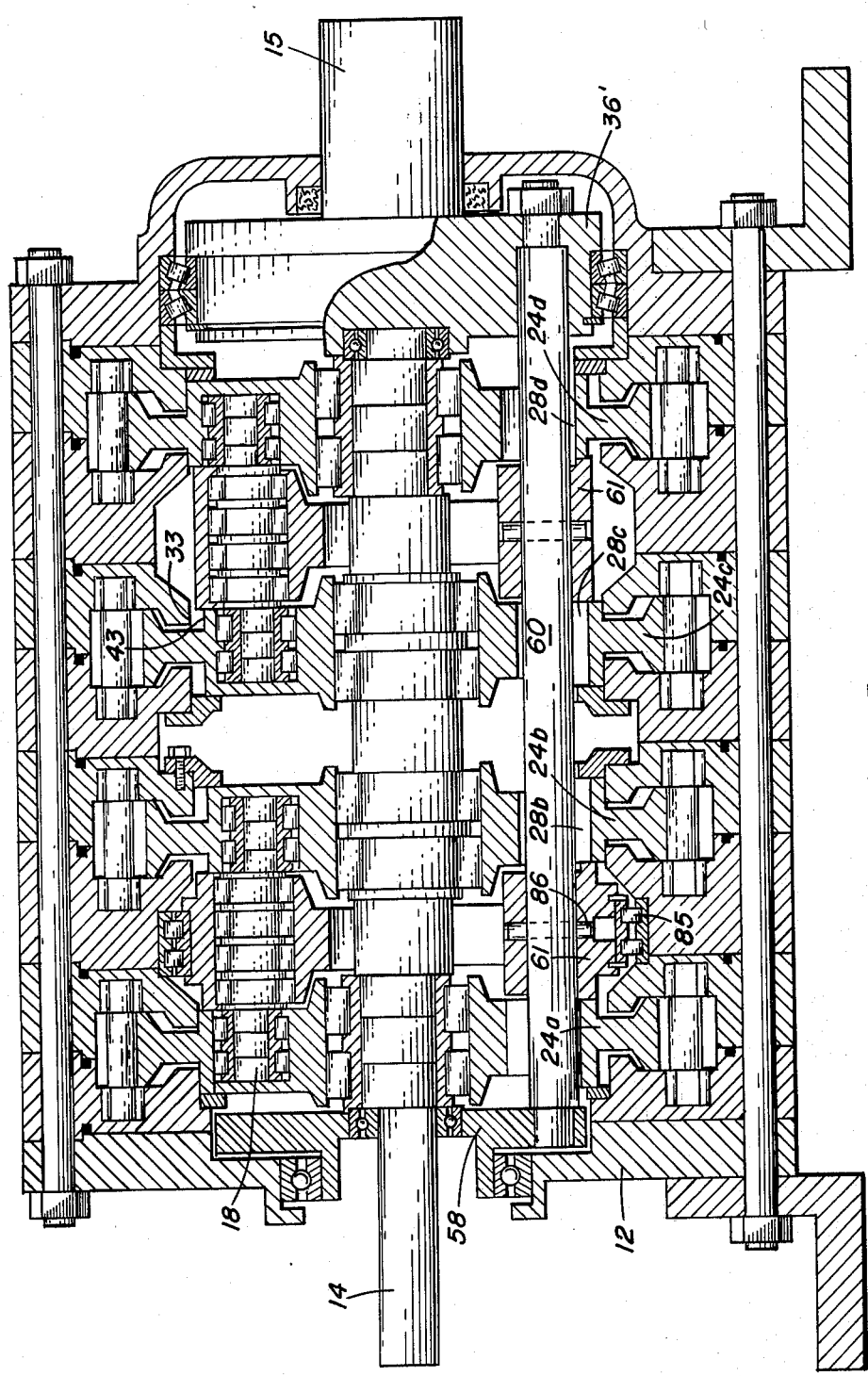

Shown in FIGS. 5a through 5c are embodiments of a transmission capable of transmitting high torque to an output shaft. Stability is provided to the transmission by a plurality of bars or struts 60 extending parallel to crankshaft 14. Supporting the bars 60 are support ring 661 positioned between discs 24a and 24b and ring 61' positioned between discs 24c and 24d. Additional support rings may be used. For instance, a support ring can be positioned between discs 24b and 24c, and so forth. Spider 36' is rigidly attached to output shaft 15 and acts as a further support ring. The support rings are rotationally mounted on crankshaft 14 by roller bearings 85 and fixidly secured to bars 60 by shear pins 86. Thus, the bars and the rings form a rigid cage which rotates about the centerline of crankshaft 14. As shown in FIG. 5b, the bars 60 are equally spaced in a circle about the centerline of the transmission.

Clearance openings 28 (denoted in FIG. 5 by 28b, 28c and 28d) in discs 24, through which the bars 60 pass, have radii sufficiently larger than the outer radii of the bars to allow passage therethrough by the bars without contacting the discs.

Reverter pins 18 are attached at one end to ring 61 and at the other end to ring 61'. Any rings positioned between rings 61 and 61' are also rigidly attached to reverter pins 18. Thus, motion of the reverter pins (imparted by discs 24) is transferred to the output shaft by the rigid cage formed by the rings and the bars.

Thus, bars 60 increase transmission stability significantly. A transmission having driving force from reverter pins transferred to the output shaft by a rigid cage is obviously more stable than a transmission having driving force transmitted by reverter pins which are supported only at one end. The reverter pins used in the transmission shown in FIG. 5 are not as susceptible to skewing forces as are those pins shown in FIG. 1 because of the support provided by the rigid cage.

The transmission shown in FIG. 5 has room for fewer reverter pins than the transmissions shown in FIGS. 1 through 4 because of the bars 60. Consequently, each remaining pin in FIG. 5 must transfer more torque than the corresponding pins shown in FIGS. 1 through 4. However, due to the increased efficiency of the transfer due to the use of the cage, the pins shown in FIG. 5 need not be any stronger than those shown in FIGS. 1 through 4.

The rings shown in FIG. 5 also serve to reduce free span of the reverter pins with attendant advantages as above-discussed.

A modification of the FIG. 5 transmission includes concentric reverter pins, such as pins 18' shown in FIG. 3 substituted for pins 18 shown in FIG. 5a. Such a modification is capable of transmitting very large torque loads to output shaft 15.

If desired, features such as guideplate 58 shown in FIG. 3, may be fixedly attached at one end of bars 60 and positioned between the housing 12 and disc 24a, the other end of said bars being connected to the spider. Such a modification is shown in FIG. 5c.

As is now evident, the guideplate, spider, and support rings provide important advantages to the transmission of the present invention. According to the principles of mechanics, in general, a simple beam is more stable than a cantilever beam. Thus, by supporting the reverter pins as simple beams by means of guideplate 58 and spider 36 or by means of a support cage formed by the support rings and bars 60, a transmission is provided having an operation which is more stable than a transmission using reverter pins supported as cantilever beams, such as the transmission shown in FIG. 1.

Figure 6A:
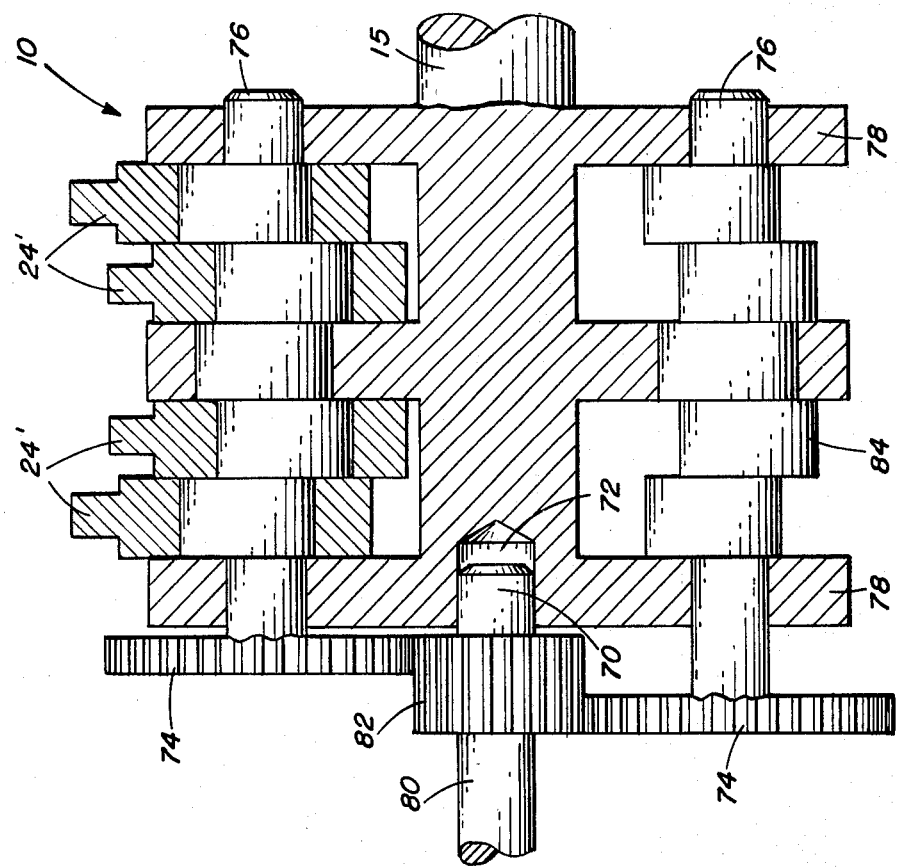
FIGS. 6a and 6b show a further embodiment of the present invention of an epicyclic transmission wherein input torque is transferred to the transmission by means of a planetary gearing system.
Figure 6B:
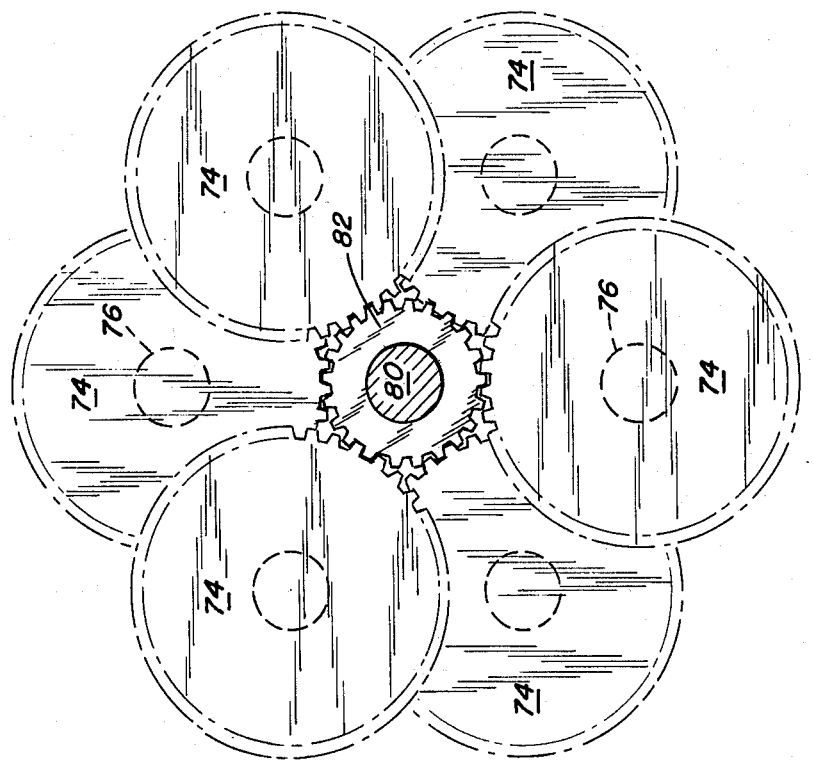

Shown in FIG. 6 as an alternative embodiment of epicyclic transmission is a high-torque transmission having low centrifugal forces. An output shaftt 15, having thereon a plurality of reverter pins seating rings 78 integral therewith, extends through the center of transmission 10 and is supported by a suitably journaled recess 72 matingly engaging input shaft projection 70 of input shaft 80. The centerline of the output shaft 15 is in alignment with the centerline of the input shaft 80. Interfitting with seating rings 78 are driver shafts 76 carrying at one end spur gears 74 meshing with input shaft gear 82. Thus, gear 82 is the sun gear in a planetary system. The shafts 76 extend parallel with the output shaft 15 and are equally spaced in a circular arrangement about shaft 15. The driver shafts 76 serve a dual purpose of reverter pin and crankshaft. As seen in FIG. 6, rings 78 support the shafts 76 as simple beams thus imparting stability thereto. The spur gears 74 surround input shaft gear 82 in a planetary arrangement and are driven synchroneously therewith, thus driving shafts 76 synchroneously. Thus, rotation of gears 74 is a combination of fast rotation about their central axis and slow planetary rotation about sun gear 82. As seen in FIG. 6, the axis of rotation of shafts 80 and 15 are coincident with the centerlines of those shafts. As is also seen in FIG. 6, the axis of rotation of sun gear 82 coincides with that of input shaft 80. Thus, the planetary rotation of gears 74 about sun gear 82 is also planetary rotation about the centerline of shafts 80 and 15. The speed of the gear 74 planetary rotation about gear 82 matches the speed of rotation of output shaft 15 about its axis of rotation. Being attached to gears 74, shafts 76 undergo rotations similar to those of gears 74.

Thus, in operation, rotation of shafts 76 imparted by the fast rotation component of gear 74 rotation is transferred to discs 24' by eccentricites 84. The cycloidal movement of discs 24' resulting from the rotation of eccentricities 84 drives shafts 76 in a rotational movement about the axis of rotation of output shaft 15. The speed of shaft 76 rotation about shaft 15 axis of rotation matches the speed of planetary rotation of gears 74. Being connected to shafts 76 by rings 78, output shaft 15 is driven in a slow rotational movement about its axis of rotation.

The centrifugal forces developed in discs 24' can be controlled by selecting gears 74 and 82 so as to effect a speed reduction between input shafts 80 and driver shafts 76 (which corresponds to the planetary rotation of gears 74). A reduction in speed of discs 24' results in a reduction of centrifugal forces developed therein. The lower speed also results in increased transmission stability. The embodiment shown in FIG. 6 may have a housing with guidetracks similar to those shown in FIG. 2 to further control centrifugal forces developed in discs 24'. Thus, a housing for the transmission in FIG. 6 would have guidetracks similar to guidetracks 40 shown in FIG. 2.

Because input torque is transferred to the output shaft along several parallel paths, to wit, shaft 76, a large amount of power can be transmitted by the transmission shown in FIG. 6.

Obviously, many modifications and variations of the present invention are possible in light of the above teachings. It is therefore to be understood that, within the scope of the appended claims, the invention may be practiced otherwise than as specifically described.

What is claimed is:

1. In an epicyclic transmission having a housing of the class wherein rotation of an input shaft is transferred to an output shaft by means of reverter pins engaging a plurality of eccentrically mounted rotating discs, the improvement comprising a cage for transferring force exerted by said pins to said output shaft, a spider fixedly secured to said output shaft, and a support ring rotationally mounted on said input shaft, said cage comprising a plurality of bars fixedly attached at one end to said spider and fixedly attached to said support ring, said reverter pins being attached to said support ring.

2. The improvement in epicyclic transmission of claim 1 including a plurality of intermediate support rings for supporting said bars, said intermediate rings being rotationally mounted on said input shaft and fixedly secured to said bars.

3. The improvement in epicyclic transmission of claim 1 further comprising means for counteracting unbalanced transmission forces, said means comprising guidetracks integral with the inner surface of said housing, and shoulders integral with said rotating discs abutting said guidetracks.

4. The improvement in epicyclic transmission of claim 1 further comprising means for countering skewing forces arising from unsynchronized rotation of said discs, said means comprising a guideplate rotatingly mounted on said input shaft, said support ring rotatingly mounted on said input shaft between said guideplate and said spider, and said plurality of bars rigidly connected at one end to said guideplate, at the other end to said spider, and intermediately to said support ring.

5. The improvement in epicyclic transmission of claim 2 wherein each of said support rings is located between a pair of said eccentrically mounted rotating discs and wherein said reverter pins each have a center portion and first and second end portions eccentrically mounted at opposite ends of said center portion, said center portions of said reverter pins being attached to said support rings and said first and second end portions being attached respectively to each of said pairs of eccentrically mounted rotating discs between which said support rings are located, wherein the eccentricity of said first and second end portions and said rotating discs is such as to provide a solid path between said input shaft and said housing.

6. The improvement in epicyclic transmission of claim 1 wherein said bars are fixedly attached to said support ring by pins.

* * * * *